United States Patent
Mimura et al.

(10) Patent No.: US 6,480,706 B1
(45) Date of Patent: Nov. 12, 2002

(54) HIGH SENSITIVITY RADIO RECEIVER

(75) Inventors: Tetsuya Mimura, Yokohama (JP); Kei Satoh, Yokosuka (JP); Shoichi Narahashi, Yokosuka (JP); Toshio Nojima, Yokosuka (JP)

(73) Assignee: NTT Mobile Communications Network, Inc., Tokyo (JP)

( * ) Notice: Subject to any disclaimer, the term of this patent is extended or adjusted under 35 U.S.C. 154(b) by 0 days.

(21) Appl. No.: 09/466,062

(22) Filed: Dec. 17, 1999

(30) Foreign Application Priority Data

Dec. 17, 1998 (JP) .......................................... 10-358580
Dec. 17, 1998 (JP) .......................................... 10-358581
Dec. 18, 1998 (JP) .......................................... 10-360774

(51) Int. Cl.[7] .............................................. H04Q 11/12
(52) U.S. Cl. ...................... 455/140; 455/118; 455/561; 333/99 R
(58) Field of Search ................................ 455/140, 118, 455/575, 90, 130, 219, 208, 209, 210, 280, 283, 561; 333/99 R, 99 S; 361/720, 722, 688, 699

(56) References Cited

U.S. PATENT DOCUMENTS 5,472,935 A  12/1995  Yandrofski et al.
5,604,925 A   2/1997  O'Malley et al.
5,771,017 A * 6/1998  Dean et al. ................. 342/374
5,995,851 A * 11/1999 Lim .......................... 455/561
6,205,340 B1 * 3/2001 Yandrofski et al. ......... 455/561

FOREIGN PATENT DOCUMENTS

EP    0 639 035 A1   2/1995
WO    WO 97/06606    2/1997

OTHER PUBLICATIONS

European Search Report dated Oct. 16, 2001, Appl. No. EP 99 12 4917, pps. 1–2.

* cited by examiner

*Primary Examiner*—Lester G. Kincaid
*Assistant Examiner*—Erika A. Gary
(74) *Attorney, Agent, or Firm*—Connolly Bove Lodge & Hutz LLP

(57) ABSTRACT

A receiver directs the center of the main beam of the antenna directivity response in a desired direction by passing signals received by n antenna elements 1a to 1d through a phase shifter 3. An output from the phase shifter 3 is passed through a receiving filter 5 and is then amplified by a low noise amplifier 6 to be delivered as an output. The phase shifter 3 is confined together with the receiving filter 5 and the amplifier 6 in a cryostat 8, and the phase shifter 3 as well as the receiving filter 5 and the amplifier 6 are cooled down by cooling means 9 through a cold stage 9a, whereby the thermal noises generated therein are reduced to a minimum.

16 Claims, 17 Drawing Sheets

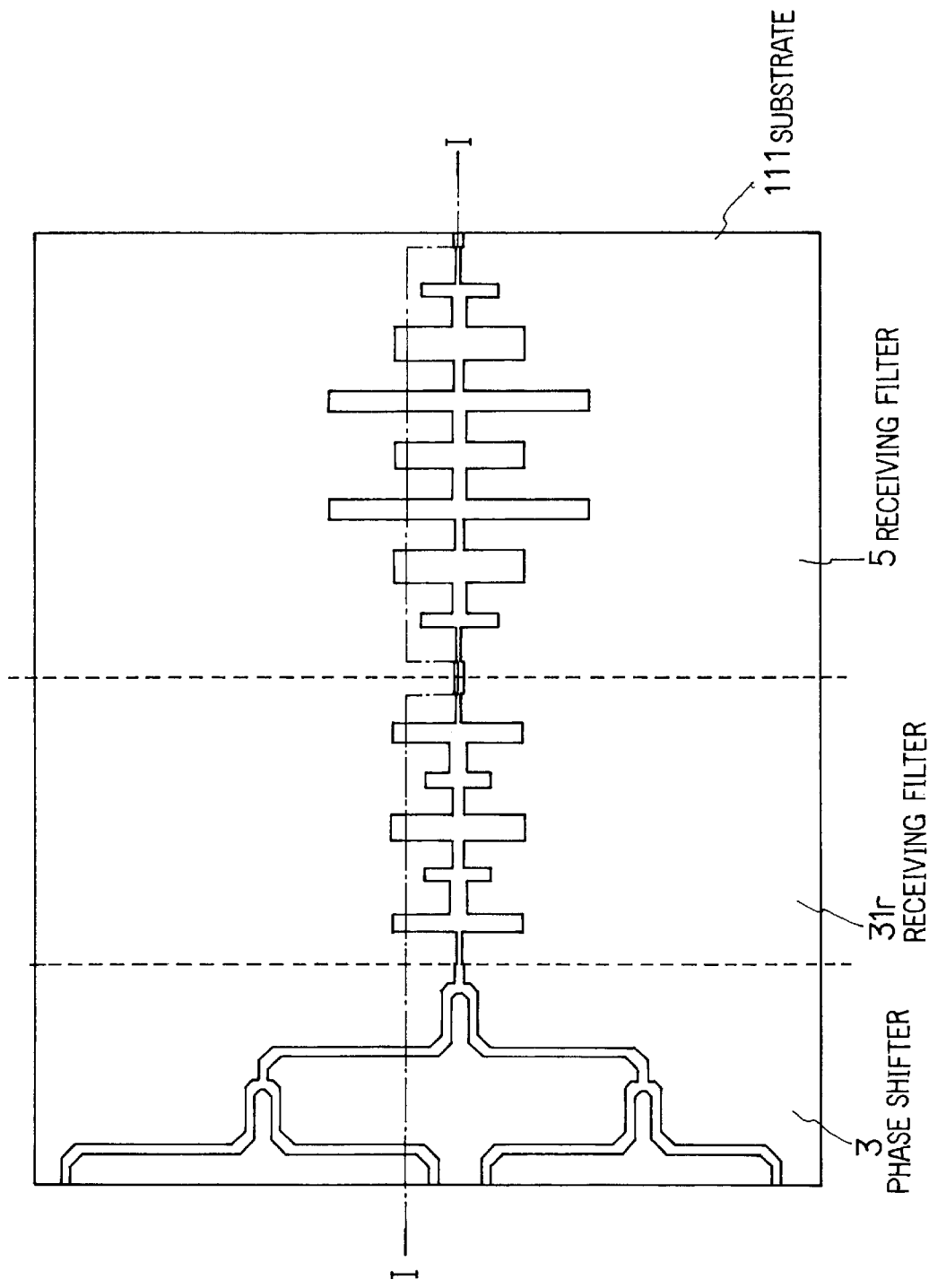

FIG.13A

114
PHASE SHIFTER REGION | RECEIVING FILTER 31r REGION | RECEIVING FILTER 5 REGION

111 SUBSTRATE — 112 SUPERCONDUCTOR THIN FILM

FIG.13B

FIG.13C  113 PHOTORESIST

FIG.13G  116 GOLD

FIG.13H  117 PHOTORESIST

3 PHASE SHIFTER | 31r RECEIVING FILTER | 5 RECEIVING FILTER

HIGH SENSITIVITY RADIO RECEIVER

BACKGROUND OF THE INVENTION

The present invention relates to a radio receiver which may be used in a mobile communication base station system, for example, and in particular, to a high sensitivity radio receiver which exhibits an improved reception sensitivity achieved through the cooling of a radio frequency receiver section.

An arrangement of a conventional high sensitivity radio receiver is shown in FIG. 1 as comprising an antenna 1 including n (where n=4 in FIG. 1) antenna elements 1a, 1b, 1c, 1d; a plurality of element feeders 2a, 2b, 2c, 2d (collectively referred to as "element feeder 2") each connected to the antenna elements 1a, 1b, 1c, 1d, respectively; a phase shifter 3 which adjusts phases of input signals from the individual element feeders 2a, 2b, 2c, 2d and combines them; an antenna feeder 4 for transmitting an output signal from the phase shifter 3; a receiving filter 5 for selecting and passing signals in a desired reception band from the signal transmitted through the antenna feeder 4; a low noise reception amplifier 6 for providing a low noise amplification of an output signal from the receiving filter 5 to a desired level; and an output terminal 7 for delivering an output signal from the low noise reception amplifier 6. Both the receiving filter 5 and the low noise reception amplifier 6 are confined in a cryostat 8, and are cooled down by cooling means 9 having a cold stage 9a which is effective to cool down the receiving filter 5 and the amplifier 6. By way of example, the cooling means 9 may include a cold head to which a copper plate may be attached to serve as the cold stage 9a, on which the receiving filter 5 and the low noise reception amplifier 6 can be mounted. There are also provided a first power supply terminal 10 which feeds the low noise reception amplifier 6 and a second power supply terminal 11 which feeds the cooling means 9. The cryostat 8 and the cooling means 9 are contained in a casing 12. Reference may be made to "A Receiver Front End For Wireless Base Stations" in Microwave Journal, Vol .39, No. 4, April 1996, for a high sensitivity radio receiver containing a receiving filter and a low noise reception amplifier, both of which are cooled, and to MWE '97 Microwave Workshop Digest, PS4-5, "Long Life Small Cryo-Cooler", for example, for a cooling means which may be used to cool down the receiving filter and the low noise reception amplifier.

The phase shifter 3 may be arranged as shown in FIG. 2. The antenna elements 1a, 1b, 1c, 1d are disposed in a vertical array with a spacing d between the elements, and a radio wave having a wavelength of λ which is incident on the array with an angle of depression of θ with respect to the perpendicular to the array may reach the antenna array with a phase difference between the adjacent antenna elements as indicated below.

$$2\pi d \sin \theta / \lambda \tag{1}$$

It will be noted that the upper the location of a particular element in the array, the more the phase of the received wave is delaying. Accordingly, when the phase shifter 3 synthesizes the signals received by the antenna elements in a manner such that a successively increasing phase delay, in increment of a $\Delta\phi=2\pi d \sin \theta/\lambda$, is applied to signals received by the antenna elements 1b, 1c, 1d as referenced to the signal received by the antenna element 1a, the signals received by the individual antenna elements are combined at an equal phase relative to each other to provide a maximum reception strength for the incidence of the radio wave at the angle of depression of θ, thus directing a main lobe of the antenna directivity, hereafter the referred to as antenna beam, in the direction of the angle θ. In this manner, a design may be employed in the mobile communication base station system which directs the center of the antenna beam depressed toward the ground surface or downward in order to enhance the sensitivity for radio waves transmitted by mobile units which are resident in a service area of a mobile communication base station. While not shown in FIG. 1, where the antenna 1 is also used for signal transmission, the transmission antenna beam may be directed toward the ground surface in order to reduce interferences with radio waves of adjacent areas.

The receiving filter 5 and the low noise reception amplifier 6 are confined in the cryostat 8 which is arranged to provide an isolation from external heat input as by vacuum heat insulation, for example. The cooling means 9 comprises a cryogenic refrigerator, which may be commercially available, and which is capable of maintaining the receiving filter 5 and the low noise reception amplifier 6 at a temperature which may be as low as several tens of Kelvin degrees, for example, for a prolonged length of time in a stable manner.

When the receiving filter 5 and the low noise reception amplifier 6 are cooled down to a cryogenic temperature for a prolonged length of time in a stable manner, thermal noises generated in the receiving filter 5 and the low noise reception amplifier 6 are reduced to a minimum while allowing the insertion loss of the receiving filter 5 to be reduced. As a consequence, the noise figure of the receiver shown in FIG. 1 is greatly improved as is the reception sensitivity. Accordingly, the use of the high sensitivity radio receiver shown in FIG. 1 brings forth advantages that a reception output in excess of a minimum prescribed C/N (carrier power/noise power), for example, can be obtained from a low level received signal and that a less power is required on the transmitting side to achieve a reception output in excess of a minimum prescribed C/N.

A conventional high sensitivity radio receiver utilizes the phase shifter 3 for adjusting the direction of the antenna beam, and thermal noises generated in the phase shifter 3 degrade the reception sensitivity of the receiver. The phase shifter 3 is disposed outside the casing 12, and this requires the provision of the antenna feeder 4, the loss of which in turn degrades the reception sensitivity disadvantageously. It is an object of the invention to provide a high sensitivity radio receiver which exhibits a high reception sensitivity if the phase shifter 3 is used for the purpose of adjusting the direction of the antenna beam.

SUMMARY OF THE INVENTION

In accordance with the invention, an antenna comprises an array of n antenna elements where n is an integer equal to or greater than 2. Signal received by individual antenna elements are input to a phase shifter where their phases are adjusted to define the center of an antenna beam which is directed in a desired direction before they are synthesized to provide an output signal, which is then passed through a receiving filter. A filter output is amplified in a low noise reception amplifier to be delivered to an output terminal. It is premised that the receiving filter and the low noise reception amplifier of the high sensitivity radio receiver are confined in a cryostat, and are cooled down by cooling means.

It is a first feature of the invention that the phase shifter is confined in the cryostat to be cooled down by the cooling means.

An antenna duplexer is inserted in a path between the phase shifter and the receiving filter, both of which are confined in the cryostat, and a transmitted signal is passed through the antenna duplexer to be delivered to the antenna.

The antenna duplexer comprises a receiving filter which passes a reception band while eliminating a transmission band and a transmitting filter which passes the transmission band while eliminating the reception band. At least the receiving filter of the antenna duplexer is confined in the cryostat to be cooled down by the cooling means.

Antenna duplexers are inserted each in a path between one of the n antenna elements and the phase shifter. A transmitted signal is divided into n signals in a transmitting phase shifter where the relative phases of the divided signals are adjusted to provide output signals, which are then passed through the n antenna duplexer to be delivered to the antenna elements.

It is a second feature of the invention that the receiving filter is formed of a superconductor material which assumes a superconducting condition when it is cooled down by the cooling means. At least part of the receiving filter of the antenna duplexer is confined in the cryostat and is connected before the receiving filter formed of the superconductor material which is, cooled down by the cooling means for as to be also cooled by the cooling means. The receiving filter of the antenna duplexer is formed of a non-superconductor material.

It is a third feature of the invention that a second receiving filter is connected after the low noise reception amplifier and is confined in the cryostat to be cooled down by the cooling means.

It is a fourth feature of the invention that each of the n antenna elements is connected to a respective antenna duplexer, the output of a respective receiving filter of the duplexer of which is connected to a series circuit including a phase shifter, a receiving filter, and a low noise reception amplifier. The outputs of these n series circuits are connected together and connected to the output terminal. The n series circuits are confined in the cryostat to be cooled by the cooling means.

BRIEF DESCRIPTION OF THE DRAWINGS

FIG. 12 is a view briefly illustrating an example of a circuit pattern of a module implementing a phase shifter 3, a receiving filter 31r and a receiving filter 5 on a common substrate;

FIGS. 13A to 13K are cross sections taken along a line I—I shown in FIG. 12, illustrating steps of manufacturing the module shown in FIG. 12;

DESCRIPTION OF PREFERRED EMBODIMENTS

Figure 1:
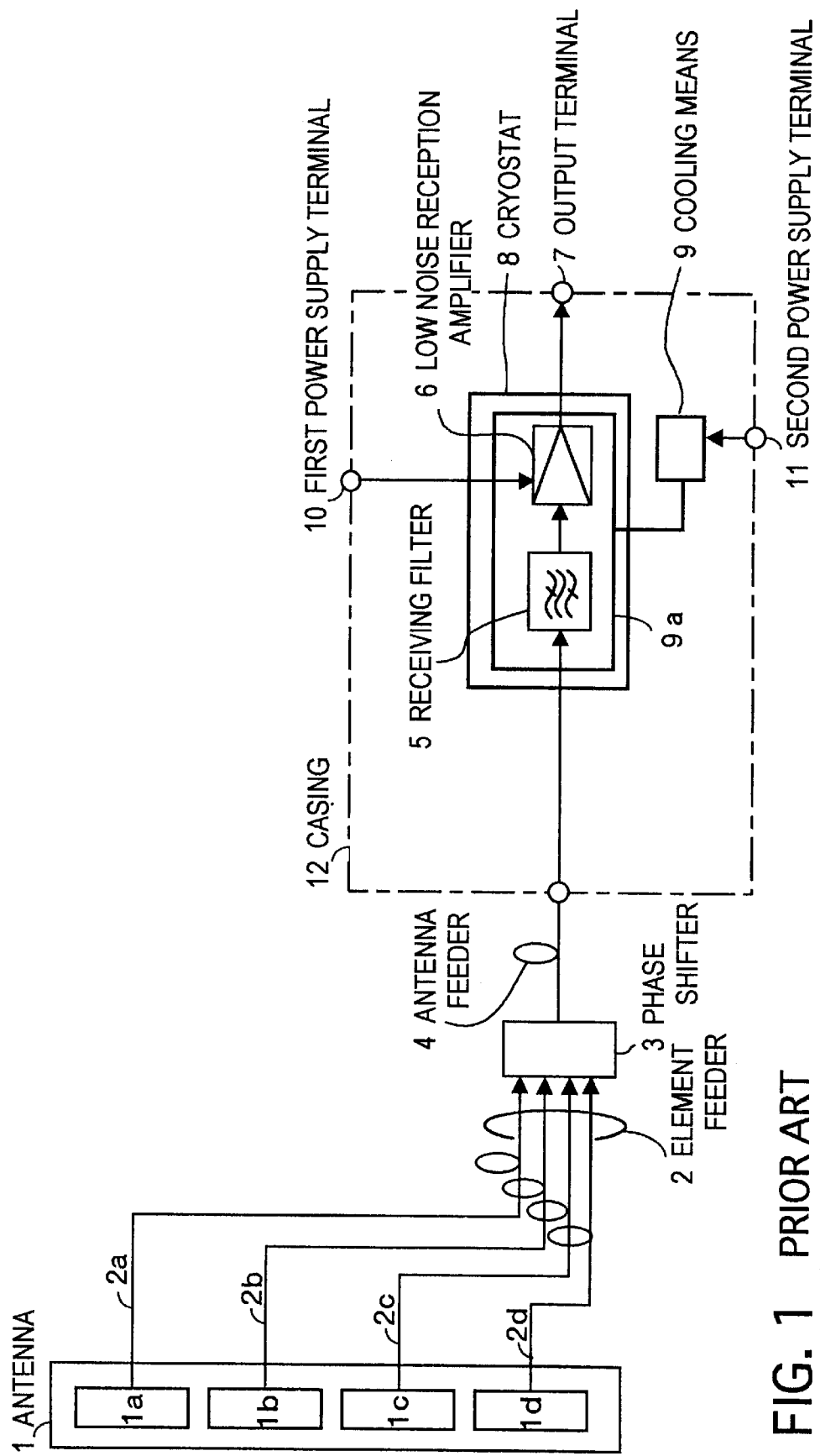
FIG. 1 is a block diagram of a conventional high sensitivity radio receiver.
Figure 2:
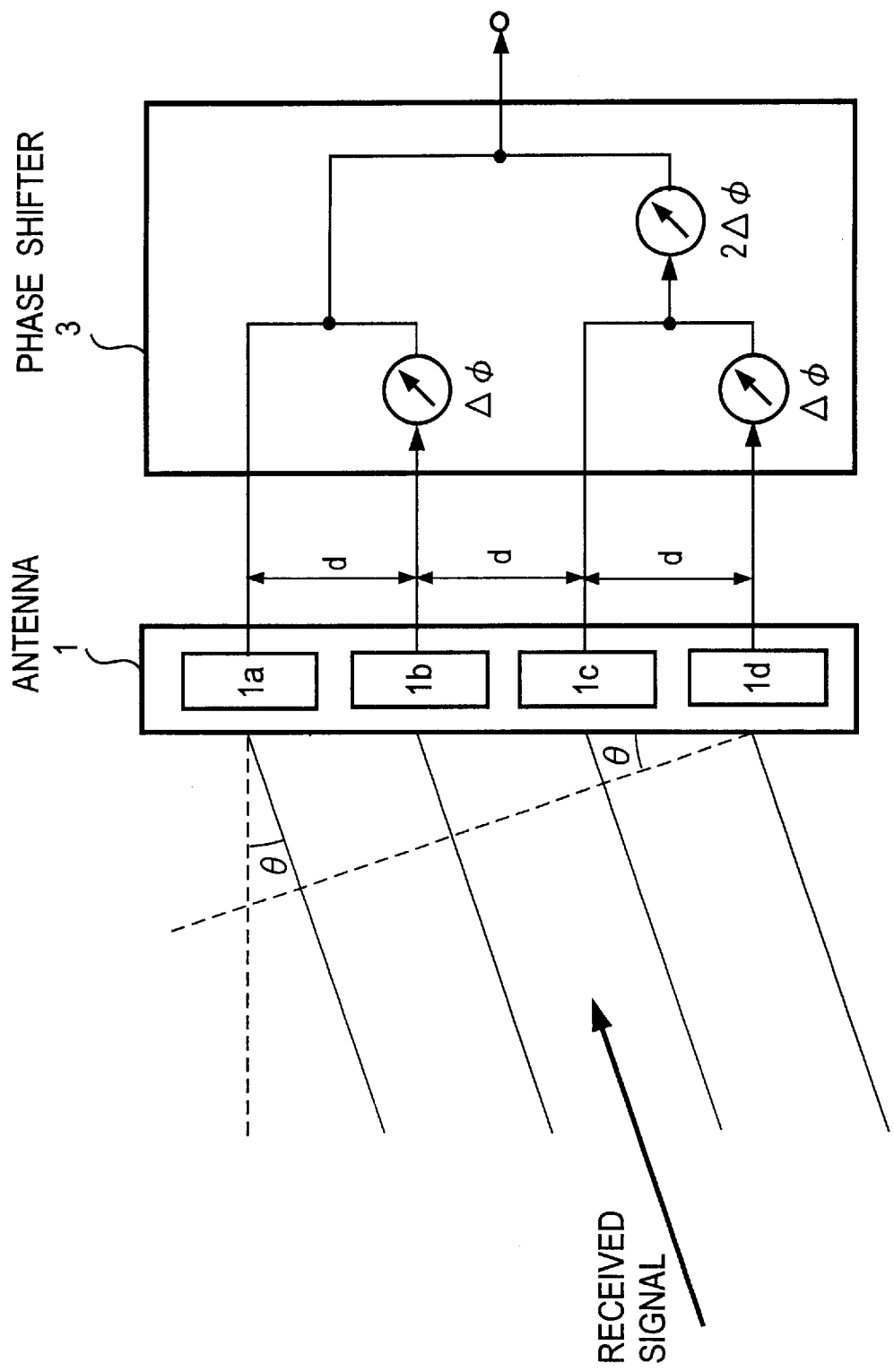
FIG. 2 is an illustration of the principle of a phase shifter 3 which imparts the directivity to an antenna 1.
Figure 3:
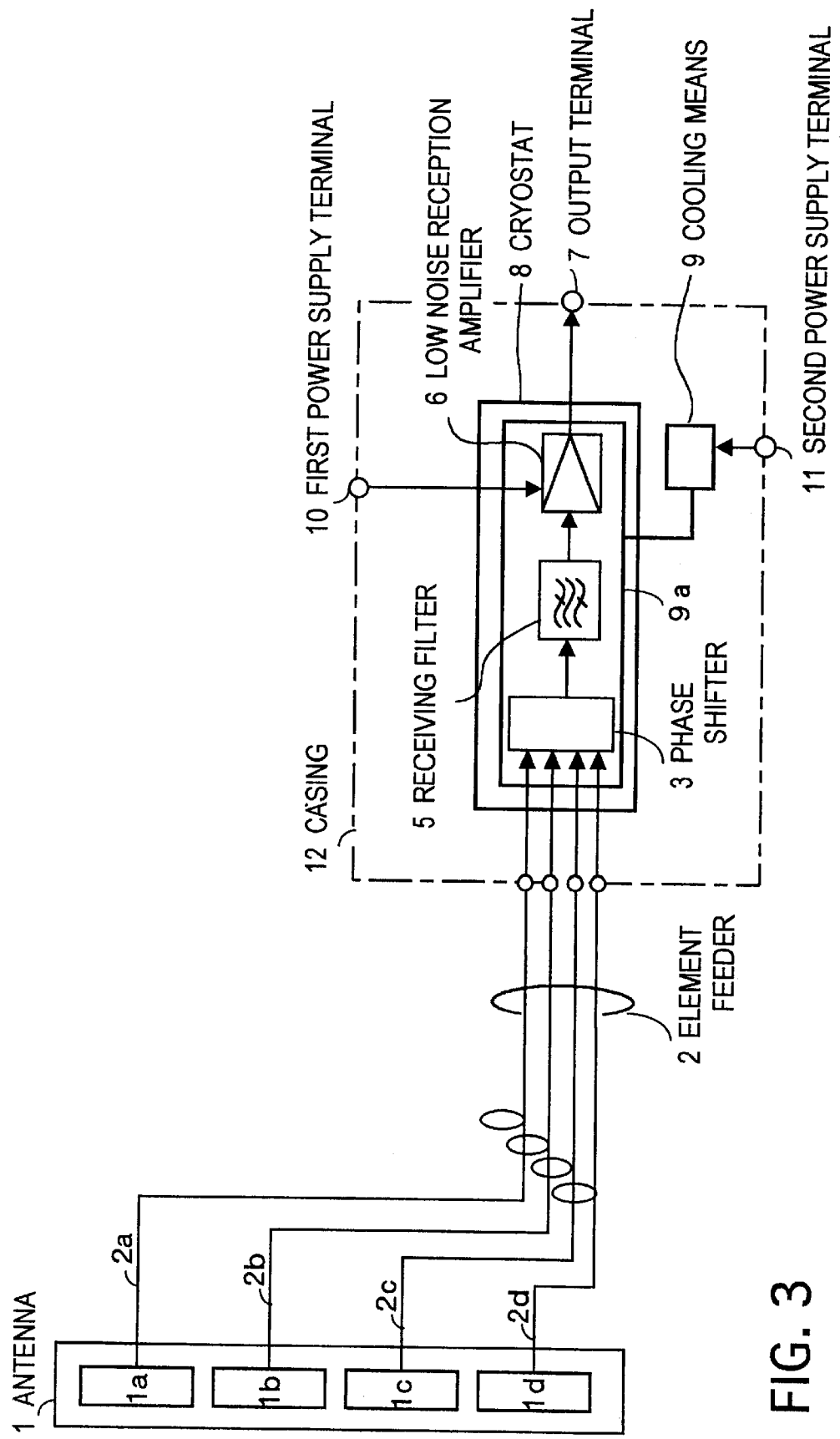
FIG. 3 is a block diagram of an embodiment of the invention.

FIG. 3 shows an embodiment of the invention where parts corresponding to those shown in FIG. 1 are designated by like numerals and characters as used before. This embodiment is distinct from the arrangement shown in FIG. 1 in that a phase shifter 3 is confined in a cryostat 8 to be cooled down by cooling means 9 through a cold stage 9a. When the phase shifter 3 is cooled down in this manner, the thermal noises generated therein can be reduced to a minimum. The receiving filter 5 is located nearer the phase shifter 3, thus eliminating the antenna feeder 4 which is provided in the prior arrangement and its associated loss, resulting in a high reception sensitivity.

The phase shifter 3 shown in FIG. 3 may be formed of a superconductor material which assumes a superconducting condition when it is cooled down by cooling means 9. Thus, the phase shifter 3 may be constructed as a micro-strip line formed as a pattern of superconductor thin films on a dielectric substrate. When the phase shifter 3 is constructed of a superconductor material, the circuit loss is drastically reduced, contributing to a further improvement in the sensitivity of the receiver. When the receiving filter 5 assumes a superconducting condition, there can be obtained a very steep cut-off. As a consequence, the selectivity of the receiver can be enhanced, allowing radio interferences from adjacent bands to be significantly reduced. This leads to an advantage that the use of the high sensitivity radio receiver allows the radio interferences to be suppressed low even if a frequency spacing (or guard band) between the signals of the own band and signals of adjacent bands is reduced, thus significantly enhancing the frequency utilization effeciency.

In addition to the micro-strip line filter, the receiving filter 5 may comprise a cavity resonator filter, a dielectric resonator filter, a semi-coaxial filter or the like, and the described advantage can be gained by forming their electrodes from a superconductor material.

Figure 4:
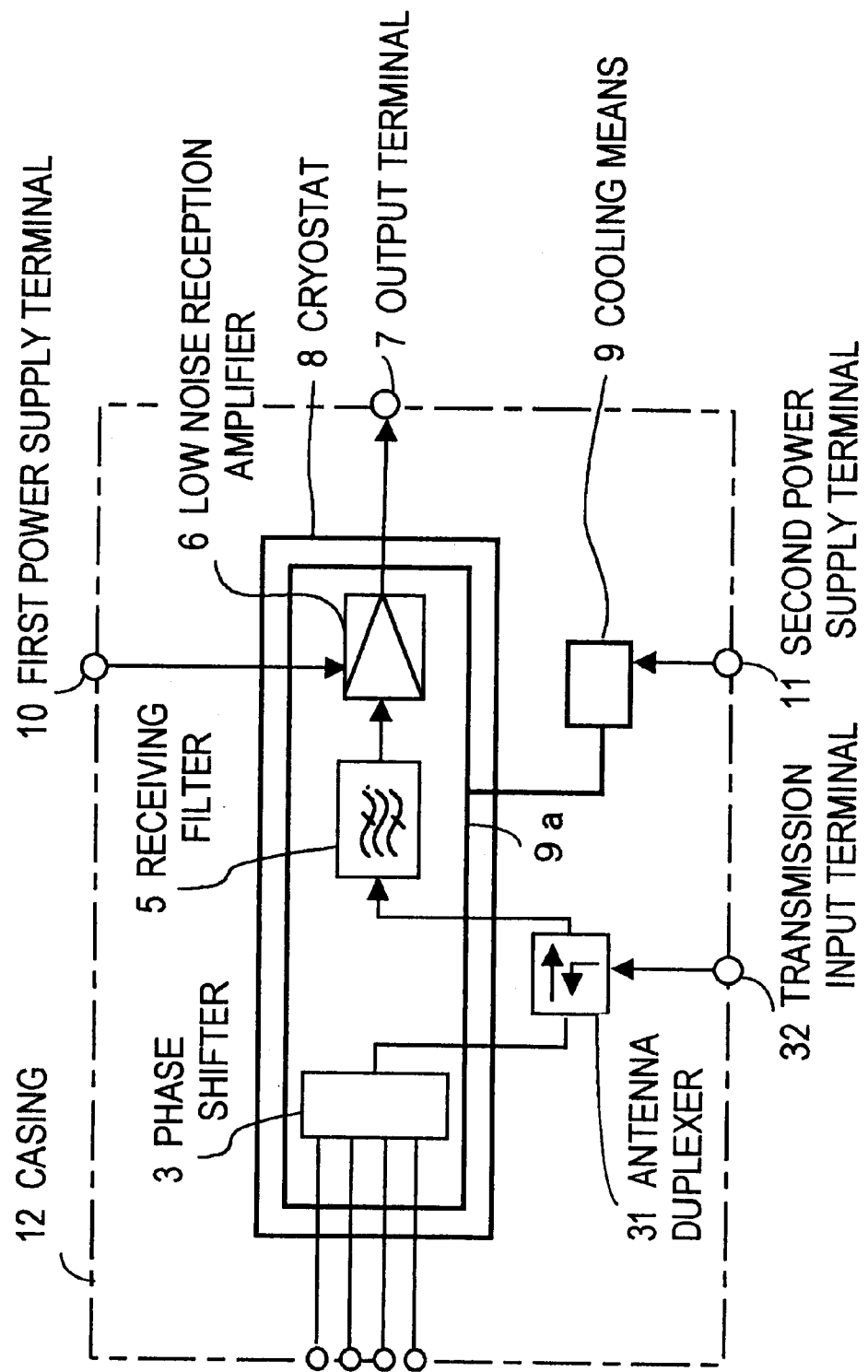
FIG. 4 is a block diagram of an example in which a antenna duplexer is provided in the embodiment shown in FIG. 3.

In another embodiment shown in FIG. 4, an antenna duplexer 31 is inserted between a phase shifter 3 and a receiving filter 5 to allow a transmitted signal which is input from a transmission input terminal 32 to be delivered to an antenna 1 through the antenna duplexer 31. The antenna duplexer 31 comprises a transmitting filter which passes a transmission band while eliminating a reception band, a receiving filter which passes a reception band while eliminating a transmission band, and a coupling circuit which couples these filters to the antenna, and functions to transmit a received signal which is input from the antenna only to the receiving filter 5 and to transmit a transmitted signal from the transmission input terminal 32 only to the antenna 1. While not shown in FIG. 4, it should be understood that outboard terminals of the phase shifter 3 are connected to the antenna elements 1a to 1d through the element feeders 2a to 2d, respectively, in the same manner as shown in FIG. 3. The same applies also for the following Figures. In this manner, when using the high sensitivity radio receiver according to the invention, the antenna 1 can be shared for the transmission and the reception. Because the superconductivity of a superconductor material is lost when a current in excess of a critical current is passed therethrough, if a high power is applied to the receiving filter 5 when it is formed of a superconductor material, the filter response will be degraded. However, with the embodiment shown in FIG. 4, the receiving filter of the antenna duplexer 31 provides an attenuation on the order of 30 dB to transmission band signals and thus suppresses it from being applied to the receiving filter 5, allowing the receiving filter 5 to operate satisfactorily as a superconductor filter.

Figure 5:
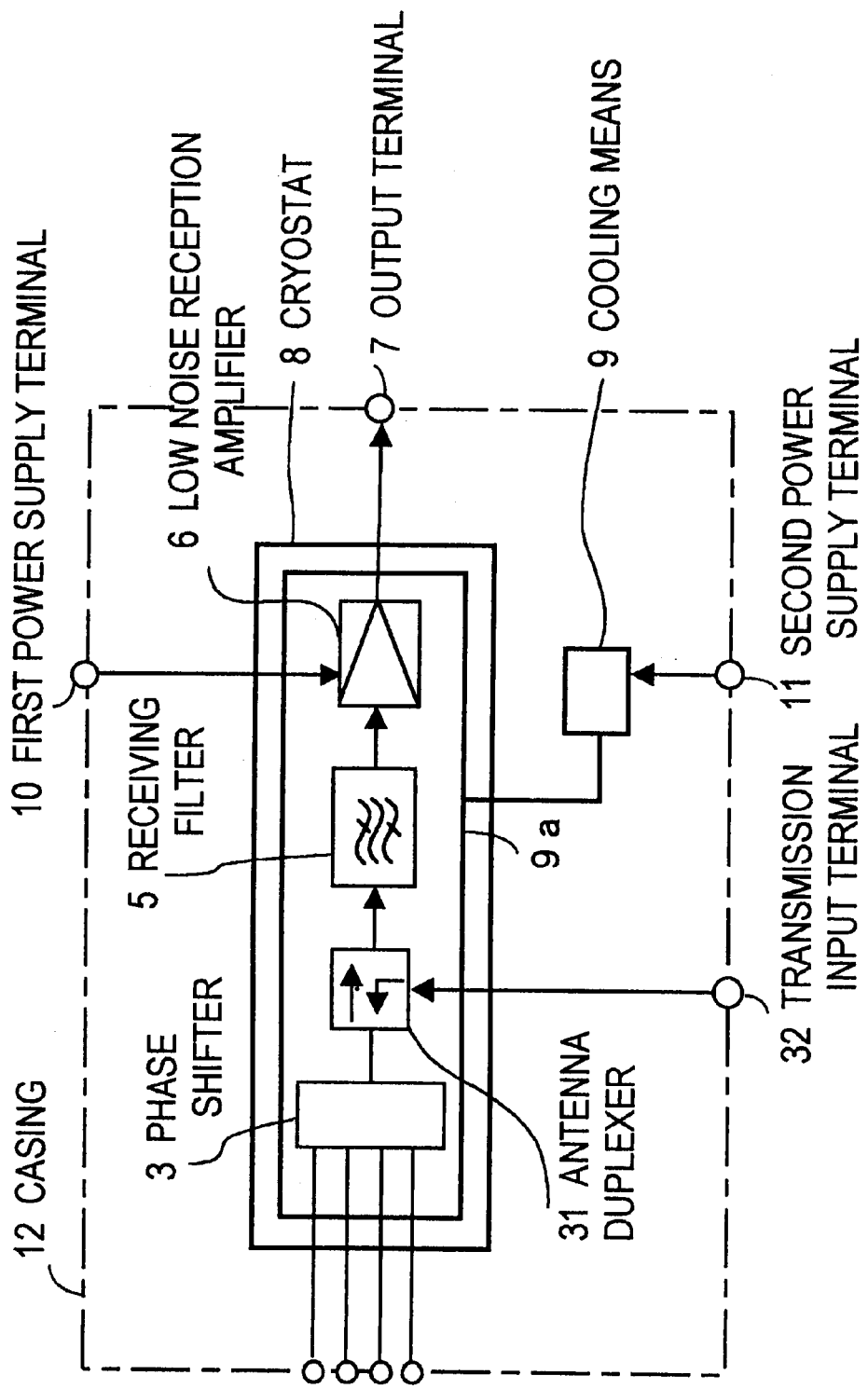
FIG. 5 is a block diagram of another example in which an antenna duplexer 31 is confined in the cryostat 8.

As shown in FIG. 5, the antenna duplexer 31 may be confined in the cryostat 8 to be cooled down through the cold stage 9a of the cooling means 9. When the antenna duplexer 31 is cooled down in this manner, the thermal noises generated therein can be reduced to a minimum, with consequence that a high reception sensitivity is realized. Specifically, if the power of the transmitted signal is as high as several tens to 100W or if an out-of -band signal of high level may be input to the antenna 1 as may be experienced in an urban area, the receiving filter which is contained in the antenna duplexer 31 to pass a signal received by the antenna to the receiving filter 5 would have to exhibit an increased attenuation with respect to the transmission band, but the insertion loss of the receiving filter in the antenna duplexer 31 would be greater. However, when the antenna duplexer 31 is confined in the cryostat 8 to be cooled down by the cooling means 9, thermal noises which would be generated in the receiving filter of the antenna duplexer 31 will be reduced. In addition, if the receiving filter 5 is formed of a superconductor material to be cooled down by the cooling means 9 to assume a superconducting condition, a transmitting signal of a high power can be blocked from reaching the receiving filter 5, allowing a satisfactory operation of the latter.

Figure 6:
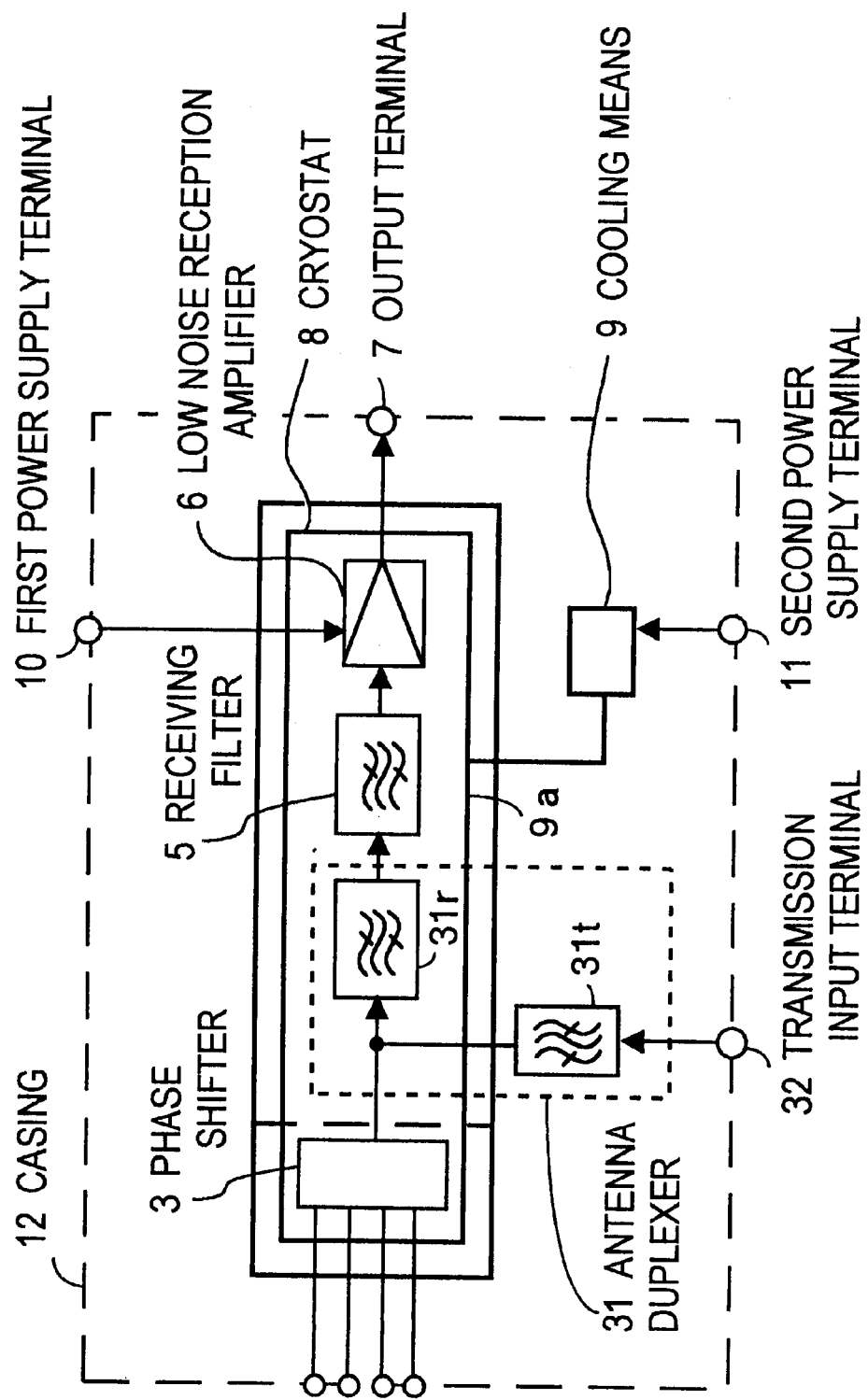
FIG. 6 is a block diagram illustrating a further example in which part of the antenna duplexer 31 is confined in the cryostat 8.

In an embodiment shown in FIG. 6, an antenna duplexer 31 includes a transmitting filter 31t which has a pass band for the transmission band and a eliminating band for the reception band and which is disposed outside the cryostat 8, and a receiving filter 31r which has a eliminating band for the transmission band and a pass band for the reception band and which is disposed within the cryostat 8. The transmitting filter 31t is disposed outside the cryostat 8 and thus is without cooling thereof because transmitted signal of relatively high power is transmitted therethrough, causing a relatively large amount of heating due to the loss thereof. According to this embodiment, cooling means 9 of a reduced cooling capacity as compared with that used in the embodiment shown in FIG. 5 can be employed. It is to be noted that because a transmitted signal is of a high power, thermal noises generated within the transmitting filter 31t present no significant problem without cooling of the transmitting filter 31t. The receiving filter 31r in the antenna duplexer 31 may comprise a micro-strip line filter, a cavity resonator filter, a dielectric resonator filter, a semi-coaxial filter or the like and may be formed of a nonsuperconductor metal. A similar choice is used when the receiving filter 31r is disposed outside the cryostat 8. As indicated in broken lines in FIG. 6, even if the cryostat 8 is arranged so that the phase shifter 3 is disposed outside the cryostat 8, the cooling effeciency resulting from disposing the receiving filter 31r within the cryostat 8 and the effect of forming the receiving filter 5 of a superconductor material remain to be similar as mentioned before.

Figure 7:
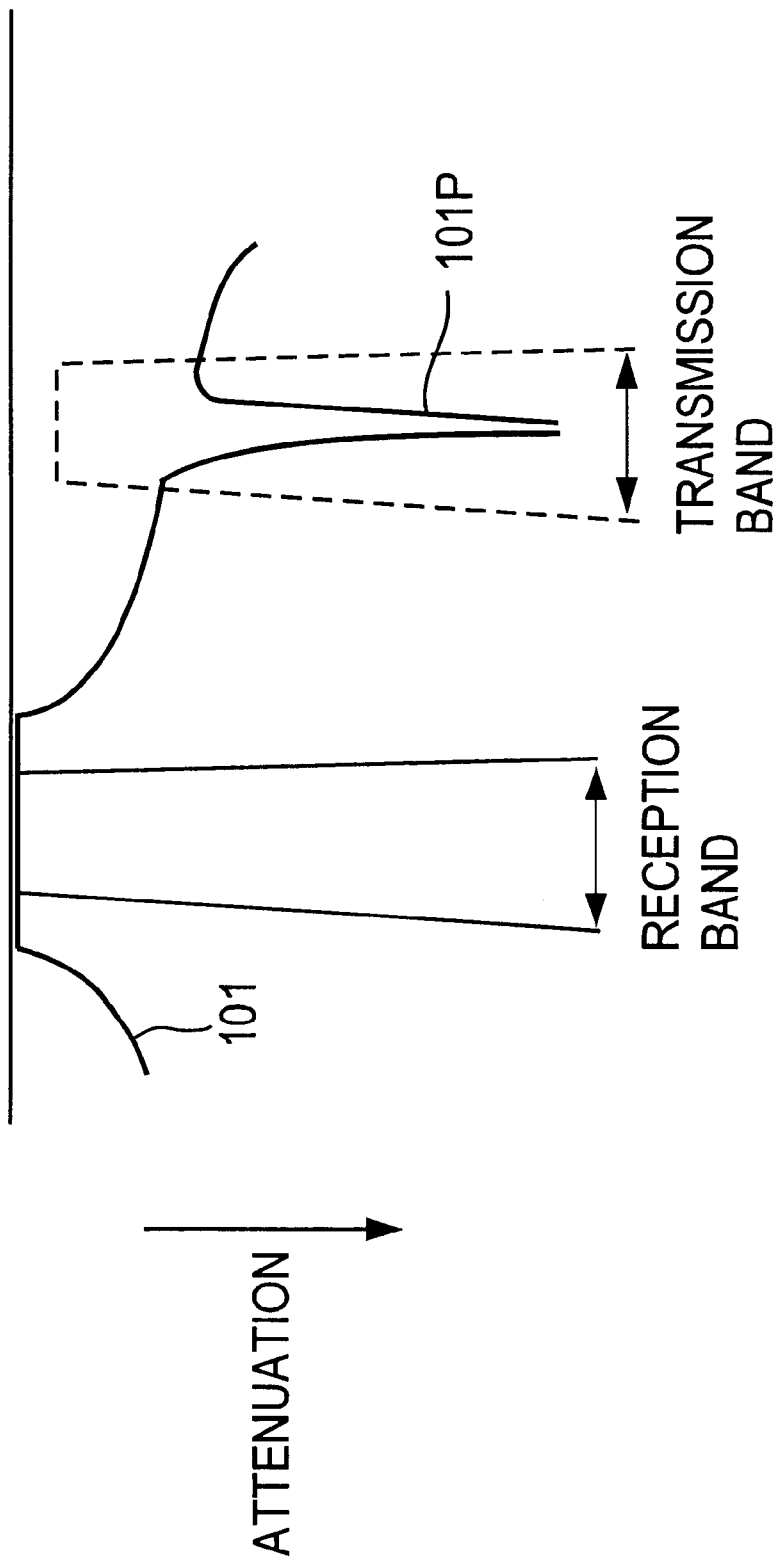
FIG. 7 graphically shows a transmission response of a receiving filter 31r shown in FIG. 6.

When a single antenna is used for the transmission and the reception, it is necessary that the receiving filter 31r be capable of providing an increased attenuation, in particular for the signal in the transmission band. Accordingly, the receiving filter 31r is constructed to exhibit an attenuation pole for transmission band frequencies. As an example, FIG. 7 graphically shows a transmission response of the receiving filter 31r. As indicated by a curve 101 in FIG. 7, when the transmission response of the receiving filter 31r is arranged to exhibit an attenuation pole 101P at a certain transmission frequency band, a desired attenuation response can be obtained with a reduced number of stages with a consequent suppression of the resulting insertion loss. In FIG. 7, the receiving filter 31r has a band pass response for the reception frequency band and has an attenuation response produced by a pole in the transmission frequency band.

Figure 8:
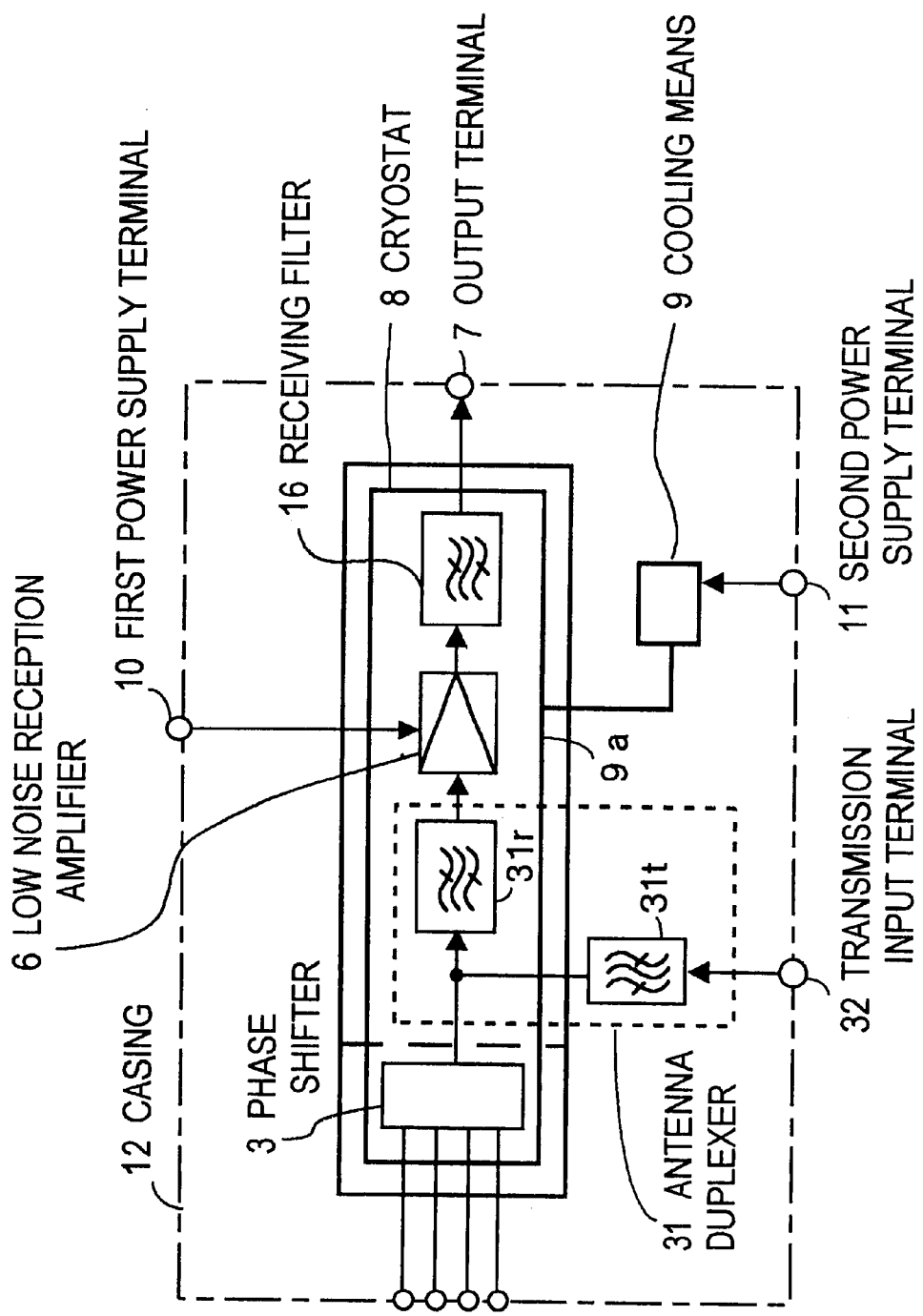
FIG. 8 is a block diagram of an example in which a receiving filter 16 is provided as a later stage which follows a low noise reception amplifier 6.
Figure 9B:
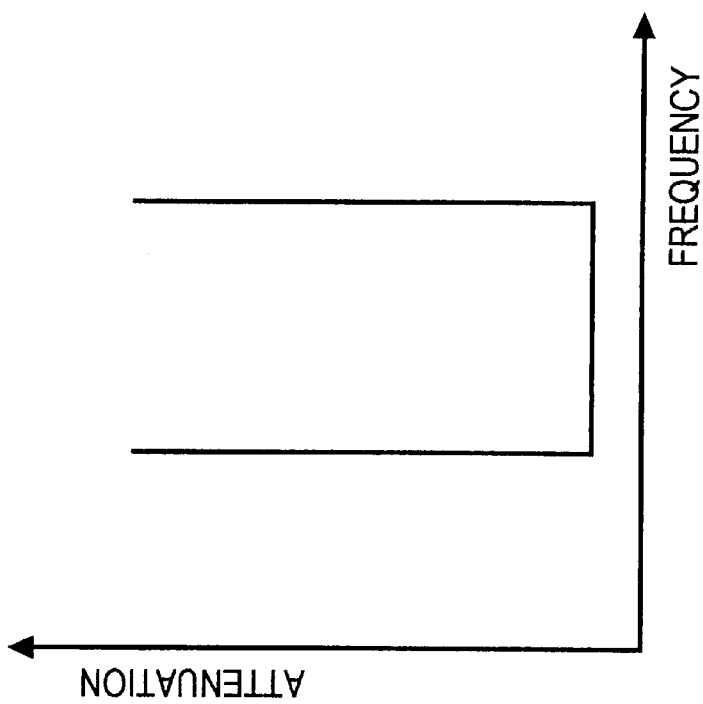
FIG. 9B graphically shows an example of a transmission response of a receiving filter 16 shown in FIG. 8.
Figure 9A:
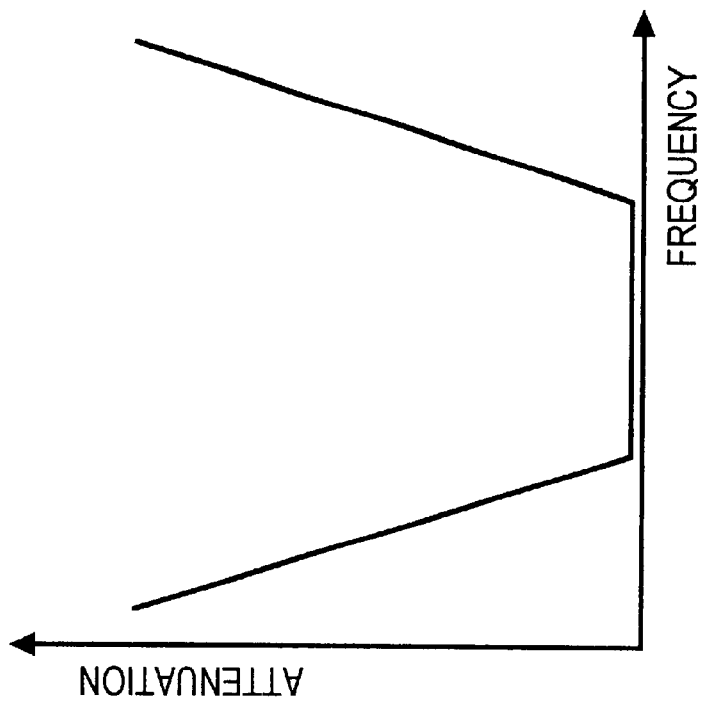
FIG. 9A graphically shows a transmission response of a receiving filter 31r shown in FIG. 8.

As shown in FIG. 8, a receiving filter 5 may be omitted, and a receiving filter 16 may be separately provided on the output side of a low noise reception amplifier 6. In this instance, the first receiving filter as recited in claim 1 refers to a receiving filter 31r. The transmission responses of the receiving filter 31r and the receiving filter 16 are graphically shown in FIGS. 9A and B. It will be understood that the loss of the receiving filter 31r has a great influence upon the reception sensitivity. Accordingly, the receiving filter 31r is constructed so that a gentle attenuation response can be achieved with a required minimum number of stages so as to attenuate interference waves while avoiding the saturation of the low noise reception amplifier 6, thus minimizing the insertion loss for the pass band. On the other hand, since the received signal which is input to the receiving filter 16 is amplified to a sufficient level in the low noise reception amplifier 6, the influence of the loss of the receiving filter 16 upon the reception sensitivity is reduced. This means that a certain insertion loss for the passband is allowed in the receiving filter 16, which therefore may be designed with a number of stages which is required to achieve an overall desired attenuation response. As a result, the entire high sensitivity radio receiver shown in FIG. 8 can achieve a high reception sensitivity and a high selectivity simultaneously. It is generally noted that the receiving filter 31r has a reduced number of stages and exhibits a more gentle cut-off response as compared with the receiving filter 16, and has a reduced loss. By contrast, the receiving filter 16 has a steep cut-off response and has an increased number of stages. The advantages mentioned above can also be achieved when the transmitting filter 31t is omitted in the arrangement of FIG. 8 to provide a receive-only radio unit. The advantage which is gained by bringing the receiving filter 16 as a later stage which follows the low noise reception amplifier 6 is similarly obtained when the cryostat 8 is constructed in a manner indicated by broken lines in FIG. 8 to dispose the phase shifter 3 outside the cryostat 8.

Figure 10:
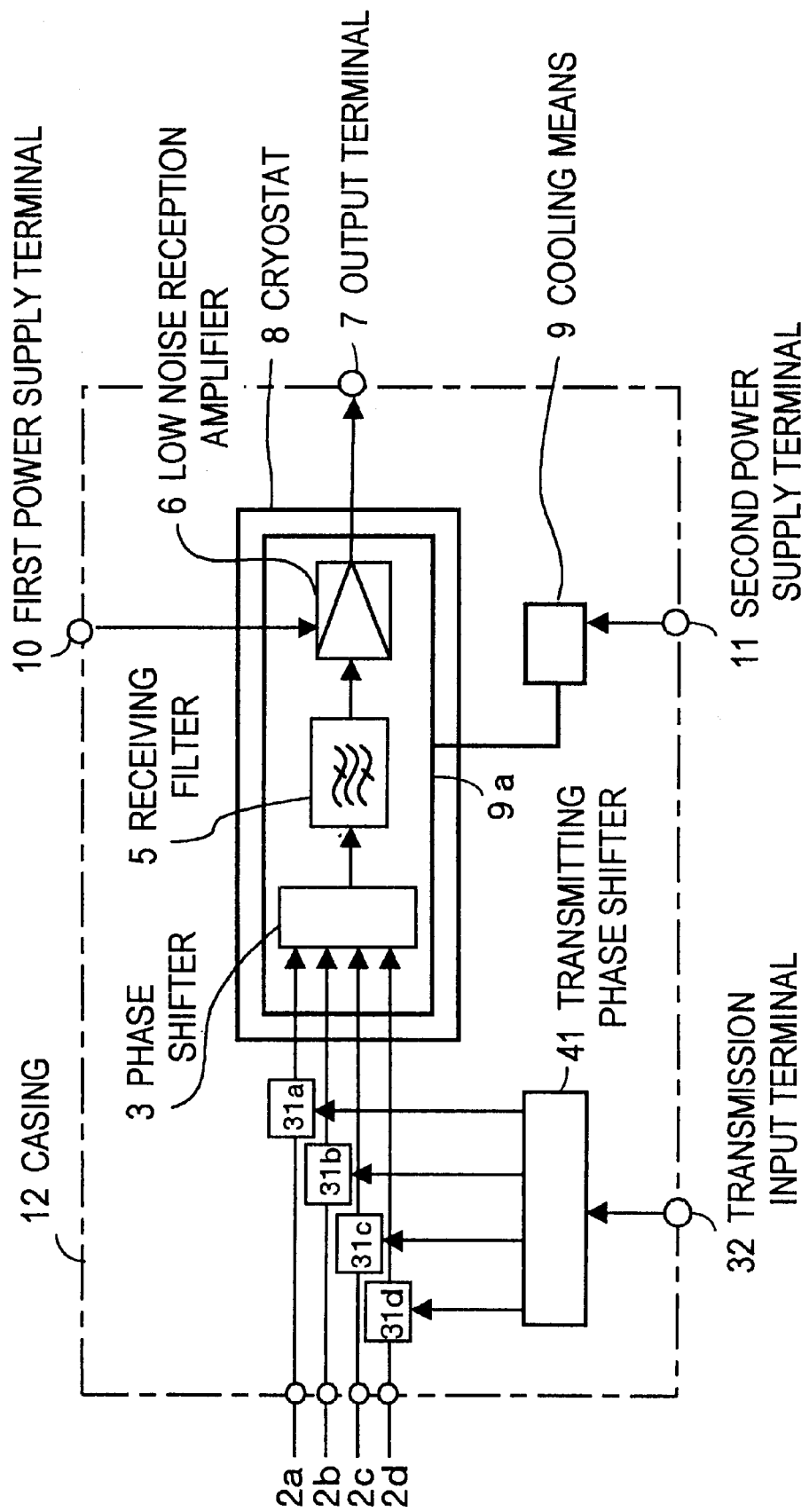
FIG. 10 is a block diagram of an arrangement in which an antenna duplexer is provided for each element feeder to allow the directivity of a transmission antenna beam to be controlled.

FIG. 10 shows another embodiment of the invention where n=4. In this embodiment, four antenna duplexers 31a, 31b, 31c, 31d are separately connected in paths between four element feeders 2a, 2b, 2c, 2d and a phase shifter 3. A transmitted signal which is input from a transmission input terminal 32 is divided into four signals in a transmitting phase shifter 41 to have phases of respective signals adjusted before they are input to associated antenna duplexers 31a, 31b, 31c, 31d to be delivered thence to respective antenna elements 1a, 1b, 1c, 1d. In this embodiment, the passage of a transmitted signal of a high power through the phase shifter 3 is avoided and the phase shifter 3 is only required to exhibit a reduced power withstanding capability, thus facilitating its design. In addition, because a load on the cooling means 9 is reduced, the size of the arrangement can be reduced.

In the embodiment shown in FIG. 10, the phase shifter 3 which is used for purpose of reception is provided separately from the transmitting phase shifter 41, and thus it is possible to change the direction of the antenna beam between the transmission and the reception. For example, the reception antenna beam may be directed more close to the horizontal direction while the transmission antenna beam may be largely depressed toward the ground surface, thus allowing a sensitivity for a weak input from a marginal service area of the own base station to be improved as far as a received signal is concerned while allowing radio interferences with respect to other areas to be suppressed as far as a transmitted signal is concerned.

Figure 11:
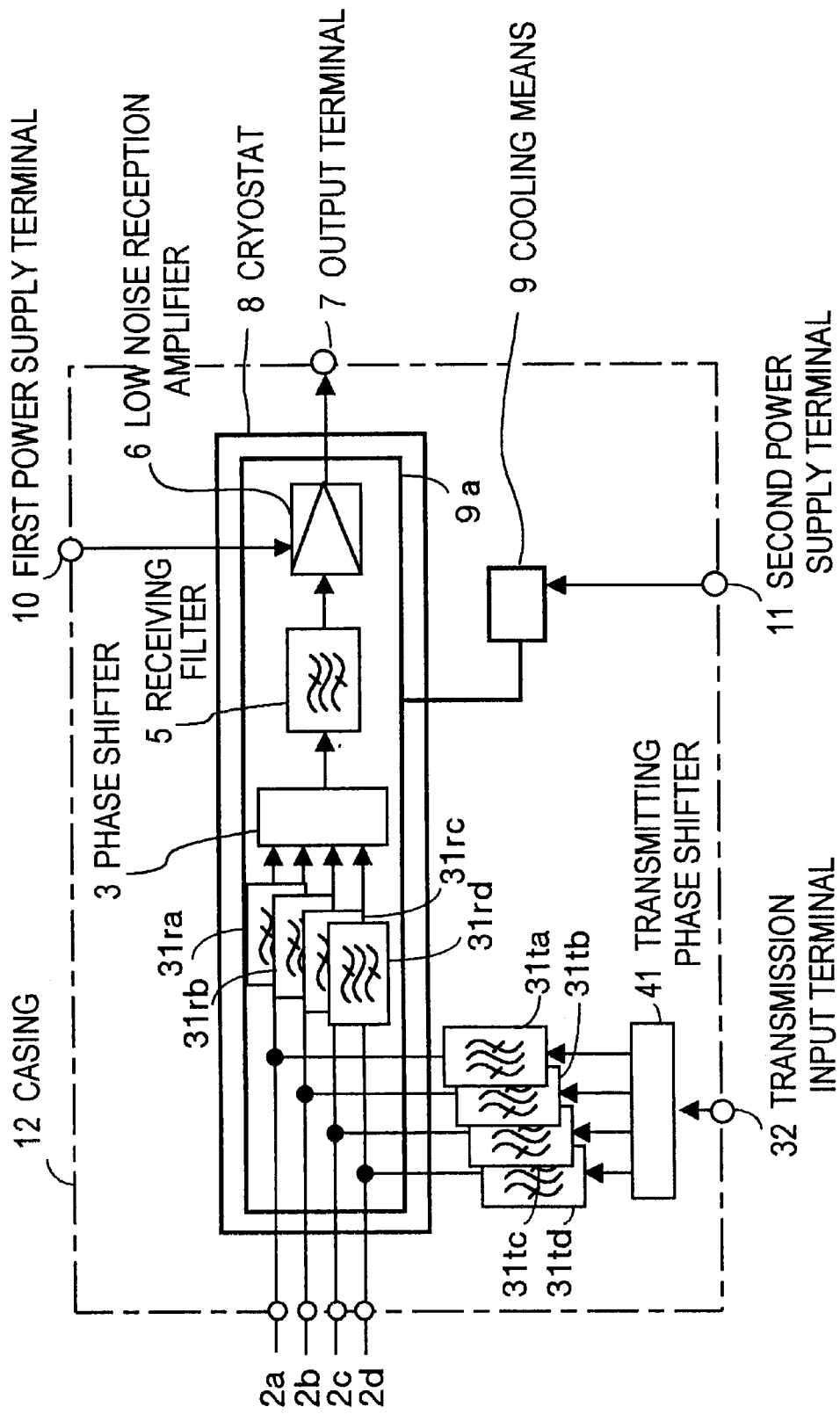
FIG. 11 is a block diagram of an arrangement in which receiving filters of the antenna duplexers shown in FIG. 10 are confined in a cryostat.

As illustrated in FIG. 11, a modification which is similar to the embodiment shown in FIG. 6 may be applied to the embodiment shown in FIG. 10. Specifically, individual receiving filters 31ra, 31rb, 31rc, 31rd in the antenna duplexers 31a, 31b, 31c, 31d may be confined in the cryostat 8 to be cooled down by cooling means 9 while transmitting filters 31ta, 31tb, 31tc, 31td, are disposed outside the cryostat 8. In this manner, the generation of thermal noises in the receiving filters 31ra, 31rb, 31rc, 31rd can be reduced than when the entire antenna duplexers 31a, 31b, 31c, 31d are disposed outside the cryostat 8, and the cooling efficiency can be improved than when the entire antenna duplexers 31a, 31b, 31c, 31d are confined in the cryostat 8 to be cooled down.

A combination of the phase shifter 3 and the receiving filter 5 or a combination of the phase shifter 3 and the receiving filter 31r or a combination of the phase shifter 3, the receiving filter 31r and the receiving filter 5 which are confined within the cryostat 8 may be formed on a common substrate. To illustrate, a method of manufacturing the phase shifter 3 and the receiving filter 31r, both of which are formed of a non-superconductor metal, and the receiving filter 5 which is formed of a superconductor material on a common substrate for the embodiment shown in FIG. 6 will be described. A pattern of the phase shifter 3, the receiving filter 31r and the receiving filter 5 on a substrate 111 is shown in FIG. 12. The manufacturing method begins with forming superconductor thin films 112 of MgO or the like on the opposite surfaces of the substrate 111 as by sputtering technique or the like, as shown in FIG. 13A. Photoresist layers 113 are formed over the entire surfaces of the superconductor thin films 112 (FIG. 13B), exposed and developed using masks (FIG. 13C), and the superconductor thin films 112 are removed by a chemical etching process using resulting masks to prepare a circuit pattern for the receiving filter 5 (FIG. 13D), whereupon the photoresist layer 113 lying over the pattern is removed to obtain the receiving filter 5 (FIG. 13E).

While protecting the receiving filter 5 by means of a photoresist layer 113, the photoresist layer 113 is removed from a region 114 in which the phase shifter 3 and the receiving filter 31r are to be formed (FIG. 13 F), and films 116 of a nonsuperconductor material such as gold which is used to form the phase shifter 3 and the receiving filter 31r are applied to the both surfaces of the substrate, as by vacuum evaporation (FIG. 13G). As indicated in FIGS. 13H, 13I and 13J, a series of process steps including the formation of photoresist layers 117, the exposure and development of the photoresist layers 117 using masks and the chemical etching process are applied to the films 116 of a metal material to define circuit patterns for the phase shifter 3 and the receiving filter 31r. Subsequently, unnecessary photoresist layers 117 over the circuit patterns and the protective photoresist layer 113 over the receiving filter 5 are removed, thus forming the phase shifter 3, the receiving filter 31 and the receiving filter 5 on the common substrate 111, as shown in FIG. 13K.

When the phase shifter and the receiving filter are formed on the common substrate, the size of the circuit can be reduced, contributing to a substantial reduction in the losses caused by the connection lines between these circuit components. In a similar manner, the receiving filters 31ra, 31rb, 31rc, 31rd, the phase shifter 3 and the receiving filter 5 can be formed on a common substrate for the embodiment shown in FIG. 11.

Figure 14:
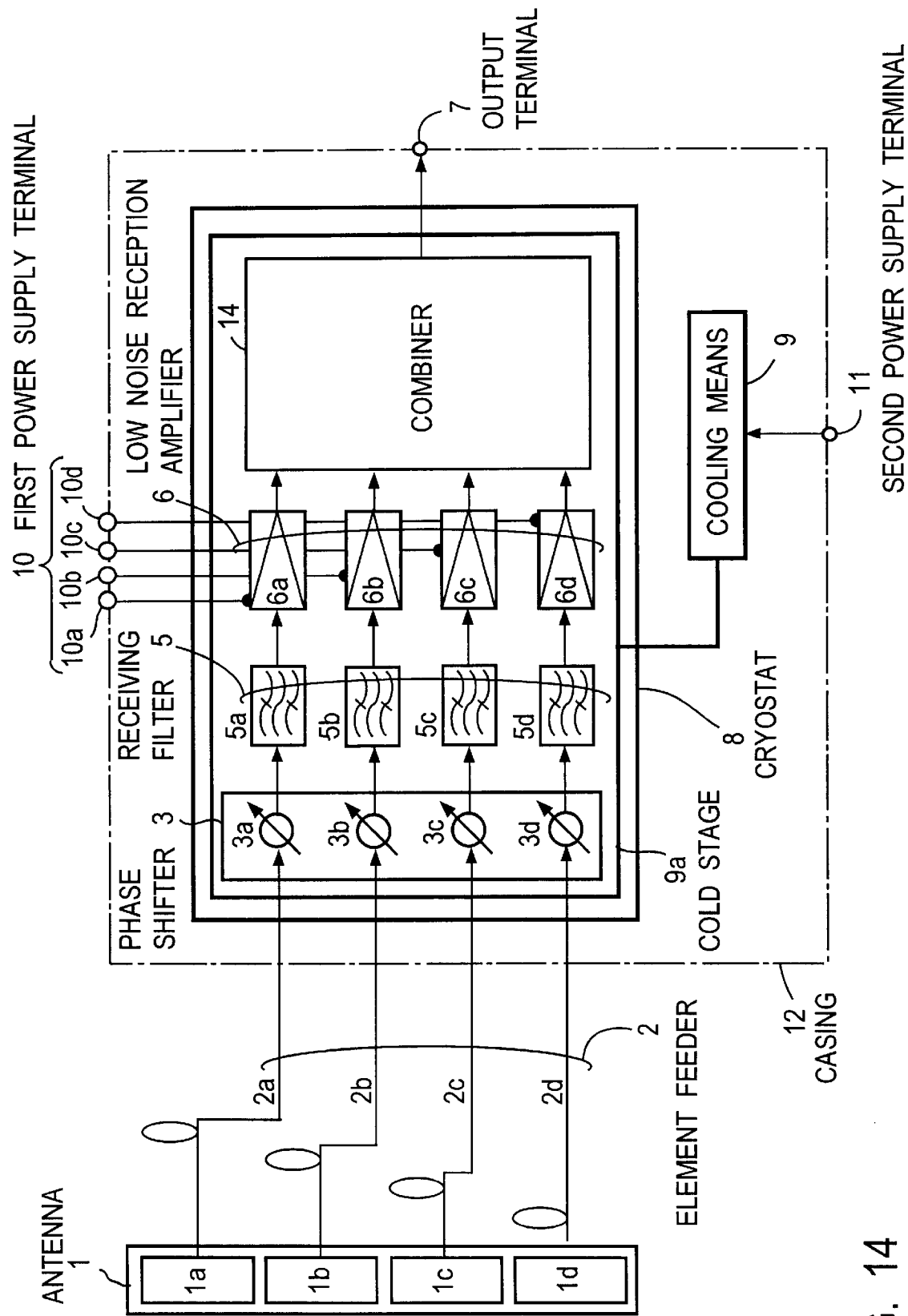
FIG. 14 is a block diagram of an arrangement in which signals received by individual antenna elements are synthesized after they are phase shifted, filtered and amplified.

FIG. 14 shows a further embodiment of the invention. In contrast to the embodiment shown in FIG. 3, a phase shifter 3 in this embodiment is provided as phase shifters 3a, 3b, 3c, 3d which are associated with each of the element feeders 2a, 2b, 2c, 2d, and outputs from the phase shifters 3a, 3b, 3c, 3d, are fed to separate receiving filters 5a, 5b, 5c, 5d, respectively. The receiving filters 5a, 5b, 5c, 5d exhibit a transmission response which is similar to the transmission response of the receiving filter 5. Outputs from the receiving filters 5a, 5b, 5c, 5d are amplified by low noise reception amplifiers 6a, 6b, 6c, 6d, respectively, and the amplified outputs are combined in a combiner 14 to be delivered to an output terminal 7. The phase shifters 3a to 3d, the receiving filters 5a to 5d, the low noise reception amplifier 6a to 6d and the combiner 14 are confined in a cryostat 8 to be cooled down by cooling means 9 through a cold stage 9a. Operating power to the low noise reception amplifiers 6a, 6b, 6c, 6d are supplied from respective power supply terminals 10a, 10b, 10c, 10d.

In this manner, signals received by individual antenna elements are combined after they are each passed through an independent phase shifter, receiving filter and low noise reception amplifier. This allows a power withstanding capability required of respective receiving filters 5a to 5d to be reduced in comparison to that required of the receiving filter 5 and the low noise reception amplifier 6 in the embodiment shown in FIG. 3 while allowing the input power to each of the low noise reception amplifiers 6a to 6d to be reduced, thus facilitating their design.

Figure 15:
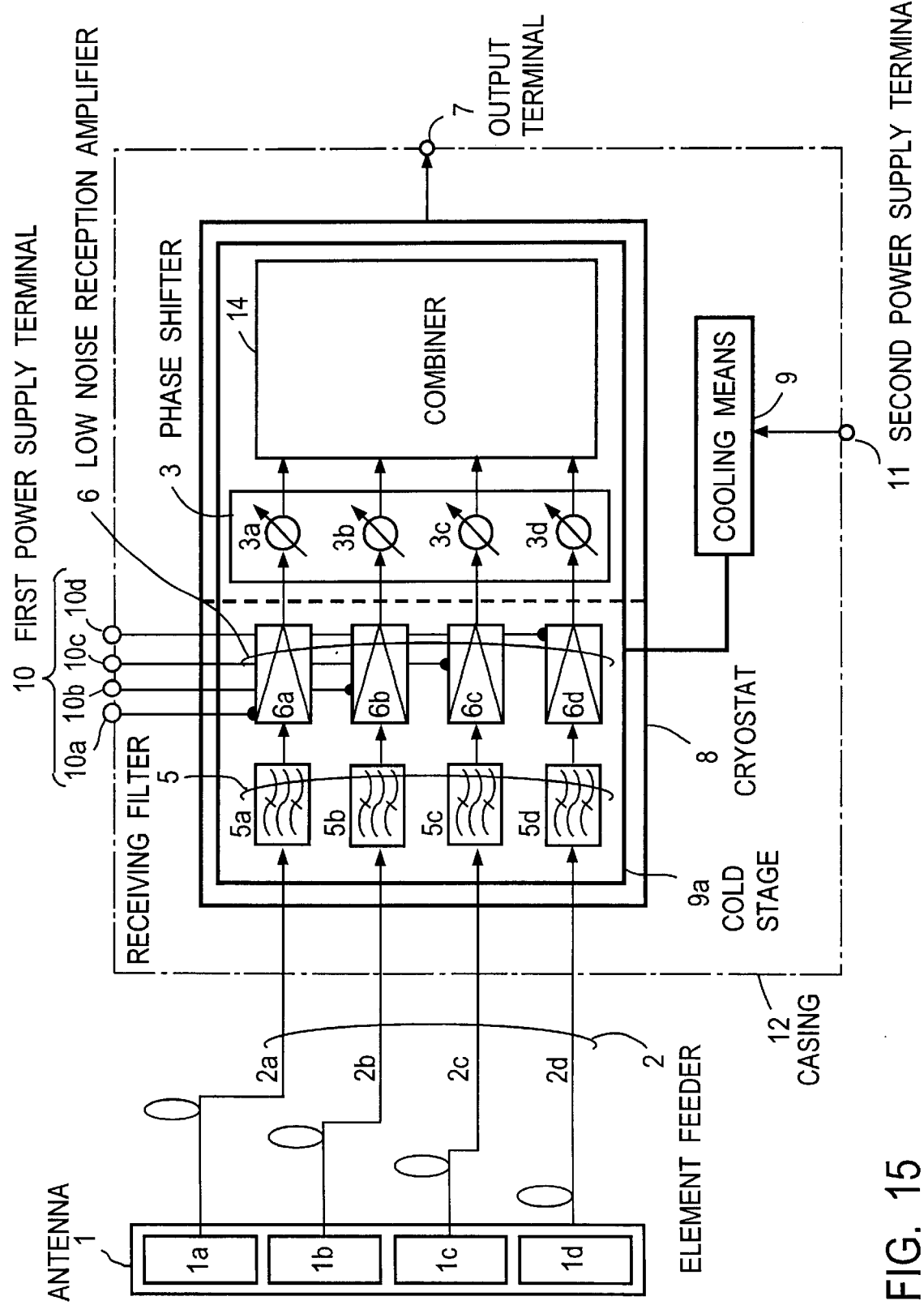
FIG. 15 is a block diagram of a modification in which the phase shifter shown in the embodiment of FIG. 14 is transposed to a location which follows the low noise reception amplifier.

As shown in FIG. 15, the phase shifters 3a to 3d shown in the embodiment of FIG. 14 may be transposed to a stage which follows the low noise reception amplifiers 6a to 6d, respectively. In this instance, a signal received by each antenna element is amplified in one of the low noise reception amplifiers 6a to 6d to a given level, and accordingly a cryostat 8 in this instance may be constructed in a manner shown by broken lines in FIG. 15, thus disposing the phase shifters 3a to 3d and the combiner 14 outside the cryostat 8.

Figure 16:
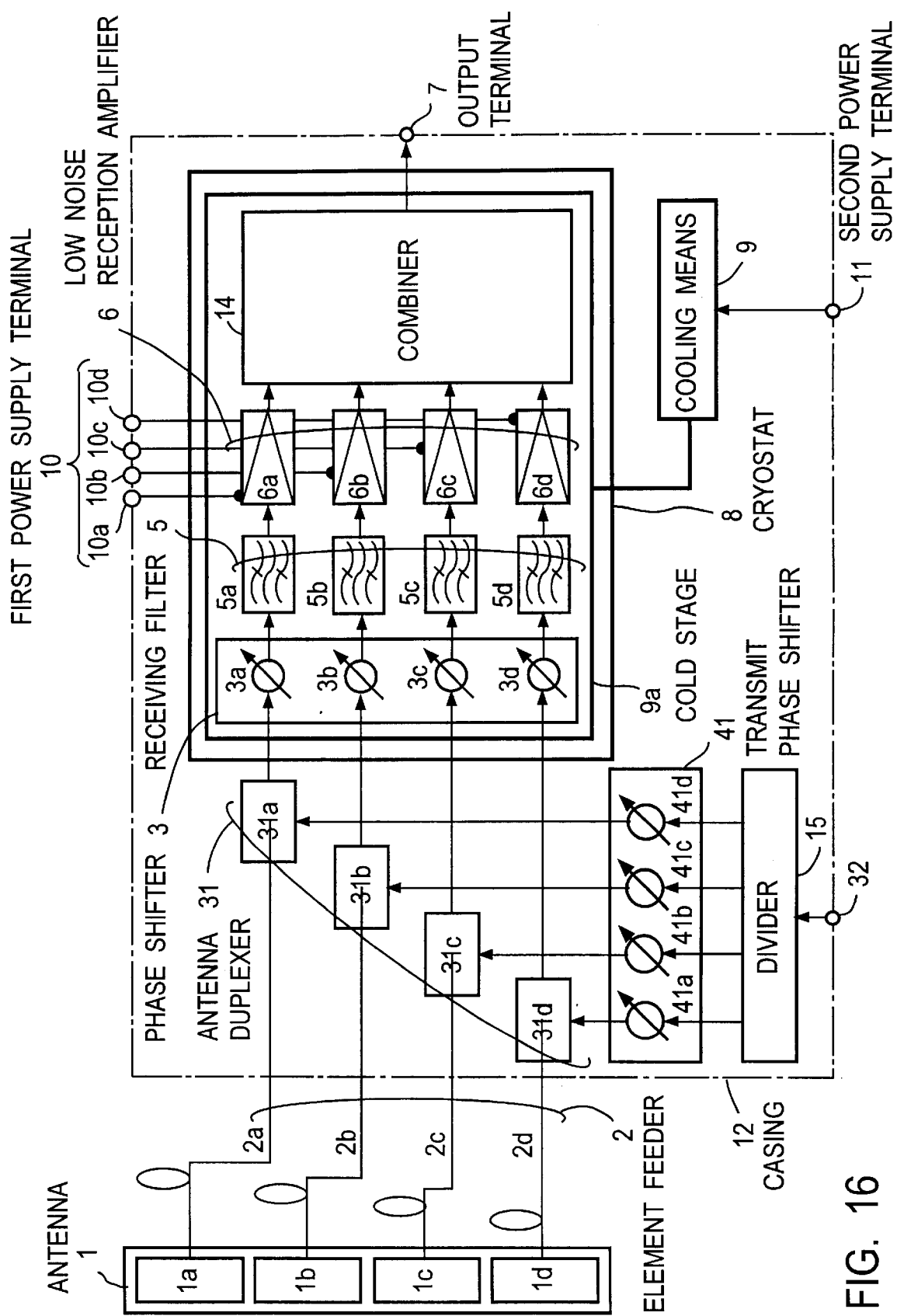
FIG. 16 is a block diagram of an arrangement in which an antenna duplexer is provided for each element feeder in the embodiment shown in FIG. 14.
Figure 17:
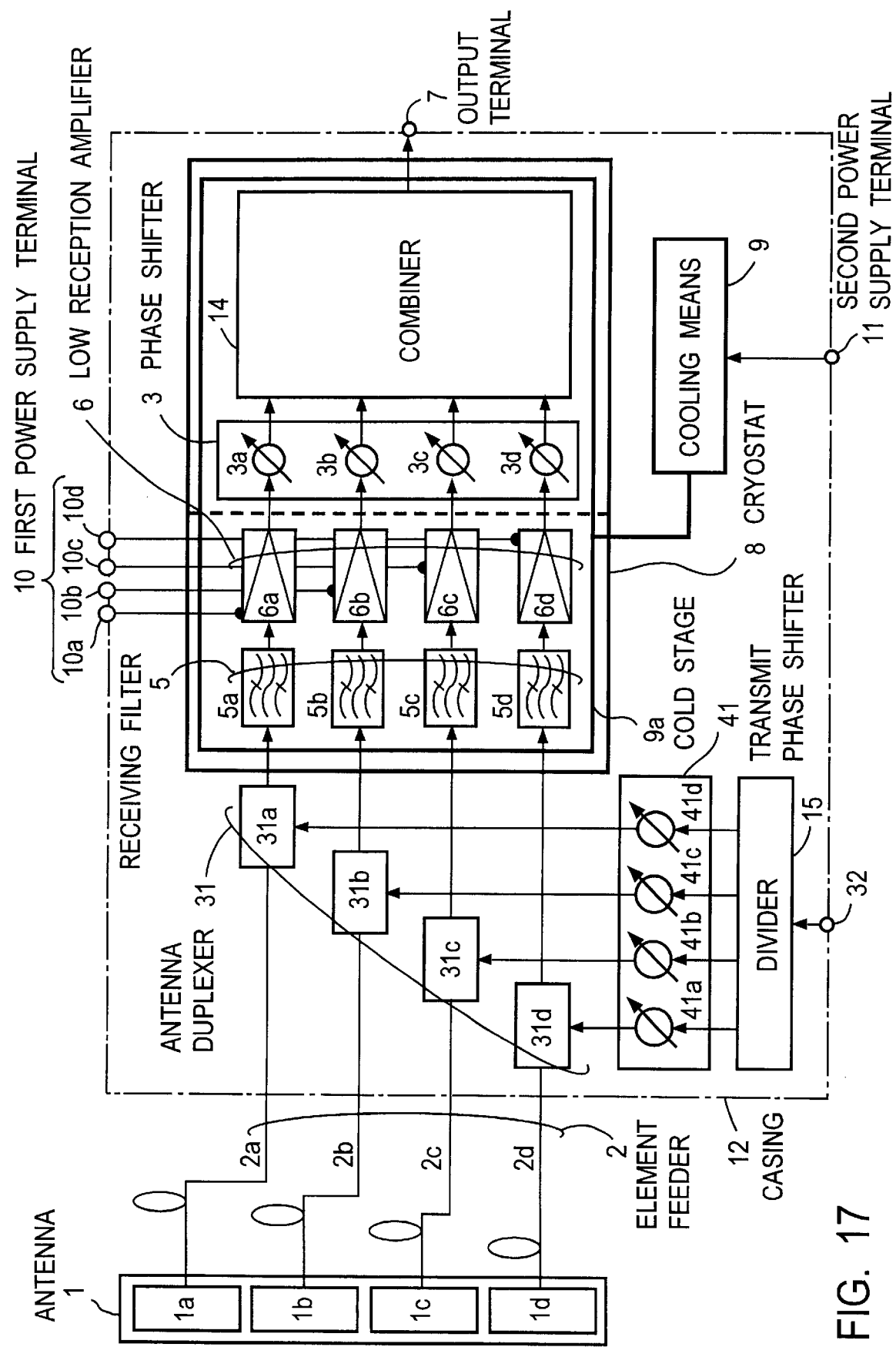
FIG. 17 is a block diagram of an arrangement in which an antenna duplexer is provided for each element feeder in the embodiment shown in FIG. 15.

As indicated in FIG. 16, the technique illustrated for the embodiment shown in FIG. 14 may be also applied to the embodiment shown in FIG. 10. Thus, signal outputs from the antenna duplexers 31a, 31b, 31c, 31d may be combined together in a combiner 14 after they are each passed through an independent combination of phase shifter, receiving filter and low noise reception amplifier. Alternatively, as shown in FIG. 17, phase shifters 3a to 3d may be transposed to a stage which follows low noise reception amplifiers 6a to 6d. A cryostat 8 may be constructed in a manner indicated by broken lines, thus disposing the phase shifters 3a to 3d and the combiner 14 outside the cryostat 8.

As discussed above, in accordance with the invention, where a phase shifter is used to provide a coupling between elements in an antenna formed by an array of a plurality of antenna elements, the phase shifter may be cooled down together with a receiving filter and a low noise reception amplifier by cooling means, thereby reducing thermal noises generated therein to a minimum while simultaneously allowing a line path which connects between the phase shifter and the receiving filter to be eliminated, with consequence that a high reception sensitivity is realized. A similar advantage can be gained if a single antenna is shared for the transmission and the reception using a antenna duplexer. While allowing a single antenna to be shared for the transmission and the reception, the direction of a transmitting antenna beam and the direction of a receiving antenna beam may be changed through a phasing control, individually thereby allowing the sensitivity for an end of an service area of the own base station to be enhanced while suppressing radio interferences with other areas, for example, thus allowing a required output power from a mobile unit to be reduced.

What is claimed is:

1. A high sensitivity radio receiver comprising:
   an antenna formed by n antenna elements where n is an integer equal to or greater than 2;
   n element feeders connected to respective antenna elements;
   n phase shifters connected to the n element feeders for controlling phases of signals received by corresponding antenna elements by a respective predetermined amount;
   n reception filters connected to the outputs of the n phase shifters for selecting a signal in a desired reception frequency band to be passed therethrough;
   n low noise reception amplifiers for providing a low noise amplification of output signals from the n receiving filters to respective desired levels;
   a combiner for combining output signals from the n low noise reception amplifiers to feed an output terminal;
   a cryostat in which the n phase shifters, the n receiving filters, the n low noise reception amplifiers and the combiner are confined;
   and cooling means for cooling down the n phase shifters, the n receiving filters, the n low noise reception amplifiers and the combiner confined in the cryostat.

2. A high sensitivity radio receiver according to claim 1, further comprising
   n antenna duplexer connected in the n element feeders, respectively;
   a divider for dividing a transmit signal from a transmit terminal into n signals;
   and n transmit phase shifters for applying a desired phase control to the n transmit signals divided by the divider to feed them to the antenna through the corresponding antenna duplexers.

3. A high sensitivity radio receiver comprising:
   an array antenna formed by n antenna elements where n is an integer equal to or greater than 2;
   n element feeders connected to the antenna elements, respectively;
   n receiving filters connected to the n element feeders for selecting a signal in a desired reception frequency band to be passed therethrough;
   n low noise reception amplifiers for providing a low noise amplification of output signals from the n receiving filters to respective desired levels;
   n phase shifters for applying respective desired phase control to output signals from the n low noise reception amplifiers;
   a combiner for combining output signals from the n phase shifters to feed an output terminal;
   a cryostat in which the n receiving filters, the n low noise reception amplifiers, the n phase shifters and the combiner are confirmed;
   and cooling means for cooling down the n receiving filters, the n low noise reception amplifiers, the n phase shifters and the combiner confirmed in the cryostat.

4. A high sensitivity radio receiver according to claim 3, further comprising
   n antenna duplexers connected in the n element feeders respectively;
   a divider for dividing a transmit signal from a transmit terminal into n signals;
   and n transmit phase shifters for applying respective desired phase control to n transmit signals which are divided by the divider to feed them to the antenna through the corresponding antenna duplexers.

5. A high sensitivity radio receiver comprising
   a first receiving filter for selecting a desired reception frequency band from a received signal from an antenna signal terminal to be passed therethrough while eliminating a transmission frequency band, the first receiving filter being formed of a non-superconductor material;
   a second receiving filter for passing a desired reception frequency band from an output signal from the first receiving filter, the second receiving filter being formed of a superconductor material;
   a low noise reception amplifier for providing a low noise amplification of an output signal from the second receiving filter to a desired level and for delivering it to an output terminal;
   a transmitting filter for passing a transmit signal from a transmit input terminal to feed the antenna while eliminating the reception frequency band;
   a cryostat in which the first receiving filter, the second receiving filter and the low noise reception amplifier are confined;
   and cooling means for cooling down the first receiving filter, the second receiving filter and the low noise reception amplifier which are confined in the cryostat to maintain the superconductor material in its superconducting condition.

6. A high sensitivity radio receiver comprising
   a first receiving filter for selecting a desired reception frequency band from a received signal from an antenna signal terminal to be passed therethrough;

a low noise reception amplifier for providing a low noise amplification of an output signal from the first receiving filter to a desired level;

a second receiving filter for selecting a desired reception frequency band from an output signal from the low noise reception amplifier to be passed therethrough to feed an output terminal, the second receiving filter having a more steep cut-off response than the first receiving filter;

a cryostat in which the first receiving filter, the low noise reception amplifier and the second receiving filter are confined;

and cooling means for cooling down the first receiving filter, the low noise reception amplifier and the second receiving filter which are confined in the cryostat.

7. A high sensitivity radio receiver comprising an antenna formed by n antenna elements where n is an integer equal to or greater than 2;

n element feeders connected to the antenna elements, respectively;

n receiving filters connected to the n element feeders for selecting a signal in a desired reception frequency band from a signal received by respective antenna element to be passed therethrough;

n low noise reception amplifiers for providing a low noise amplification of output signals from the n receiving filters to respective desired levels;

n phase shifters receiving output signals from the n low noise reception amplifiers to apply a phase control of the signals;

a combiner for combining output signals from the n phase shifters to feed an output terminal;

a cryostat in which the n receiving filters and the n low noise reception amplifiers are confined, said n phase shifters and said combiner being disposed outside said cryostat;

and cooling means for cooling down the n receiving filters and the n low noise reception amplifiers which are confined in the cryostat.

8. A high sensitivity radio reciever comprising:

an antenna formed by n antenna elements where n is an integer equal to or greater than 2;

n element feeders each connected to the respective antenna elements;

a phase shifter connected to the n element feeders to control phases of signals before such signals are synthesized;

a first receiving filter connected to the output of the phase shifter for selecting a signal in a desired reception frequency band to be passed therethrough;

a low noise reception amplifier for providing a low noise amplification of an output signal from the receiving filter to a desired level;

an output to which an output signal from the low noise reception amplifier is delivered;

a cryostat in which the phase shifter, the first receiving filter and the low noise reception amplifier are confined;

cooling means for cooling the phase shifter, the receiving filter and the low noise reception amplifier which are confined in the cryostat;and an antenna duplexer connected in a path between the phase shifter and the first receiving filter for feeding an output signal from the phase shifter to the first filter and for feeding a transmit signal from a transmit input terminal to the antenna through the phase shifter, one part of the antenna duplexer being confined in the cryostat to be cooled down by the cooling means and the remaining part of the antenna duplexer being disposed outside the cryostat.

9. A high sensitivity radio receiver according to claim 8 in which the antenna duplexer comprises a second receiving filter which has a pass band for the reception frequency band and an eliminating band for the transmission frequency band, and a transmitting filter which has an eliminating band for the reception frequency band and a pass band for the transmission frequency band, the second receiving filter being confirmed in the cryostat to be cooled down by the cooling means while the transmitting filter is disposed outside the cryostat.

10. A high sensitivity radio receiver according to claim 9 in which the phase shifter and the second receiving filter are formed of a non-superconductor material while the first receiving filter is formed of a superconductor material which assumes a superconducting condition at a temperature to which it is cooled down by the cooling means.

11. A high sensitivity radio receiver comprising:

an antenna formed by n antenna elements where n is an integer equal to or greater than 2;

n element feeders each connected to the respective antenna elements;

a phase shifter connected to the n element feeders to control phases of signals received by respective antenna elements which are input through the element feeders before such signals are synthesized;

a first receiving filter connected to the output of the phase shifter for selecting a signal in a desired reception frequency band to be passed therethrough;

a low noise reception amplifier for providing a low noise amplification of an output signal from the first receiving filter to a desired level;

an output terminal to which an output signal from the low noise reception amplifier is delivered;

a cryostat in which the phase shifter, the first receiving filter and the low noise reception amplifier are confined;

cooling means for cooling the phase shifter, the first receiving filter and the low noise reception amplifier which are confined in the cryostat; and an antenna duplexer disposed outside said cryostat and connected in a path between the phase shifter and the first receiving filter for feeding an output signal from the phase shifter to the first receiving filter and for feeding a transmit signal from a transmit input terminal to the antenna through the phase shifter.

12. A high sensitivity radio receiver comprising:

an antenna formed by n antenna elements where n is an integer equal to or greater than 2;

n element feeders each connected to the respective antenna elements;

a phase shifter connected to the n element feeders to control phases of signals received by respective antenna elements which are input through the element feeders before such signals are synthesized;

a first receiving filter connected to the output of the phase shifter for selecting a signal in a desired reception frequency band to be passed therethrough;

a low noise reception amplifier for providing a low noise amplification of an output signal from the first receiving filter to a desired level;

an output terminal to which an output signal from the low noise reception amplifier is delivered;

a cryostat in which the phase shifter, the first receiving filter and the low noise reception amplifier are confined;

cooling means for cooling the phase shifter, the first receiving filter and the low noise reception amplifier which are confined in the cryostat; and a second receiving filter connected in series to the output of the low noise reception amplifier and confined in the cryostat to be cooled down by the cooling means.

13. A high sensitivity radio receiver according to claim 12 in which the first receiving filter passes the reception frequency band and eliminates the transmission frequency band, a transmitting filter being connected to a junction between the first receiving filter and the phase shifter for eliminating the reception frequency band and passing the transmission frequency band, a transmit signal from a transmit input terminal being fed through the transmitting filter and through the phase shifter to be delivered to the antenna, the first receiving filter and the transmitting filter forming together a antenna duplexer.

14. A high sensitivity radio receiver comprising:

an antenna formed by n antenna elements where n is an integer equal to or greater than 2;

n element feeders each connected to the respective antenna elements;

a phase shifter connected to the n element feeders to control phases of signals received by respective antenna elements which are input through the element feeders before such signals are synthesized;

a first receiving filter connected to the output of the phase shifter for selecting a signal in a desired reception frequency band to be passed therethrough;

a low noise reception amplifier for providing a low noise amplification of an output signal from the first receiving filter to a desired level;

an output terminal to which an output signal from the low noise reception amplifier is delivered;

a cryostat in which the phase shifter, the first receiving filter and the low noise reception amplifier are confirmed;

cooling means for cooling the phase shifter, the first receiving filter and the low noise reception amplifier which are confirmed in the cryostat;

an antenna duplexer connected in each of the n element feeders; and a transmit phase shifter for dividing a transmit signal from a transmit input terminal into n signals, and for controlling phases of n divided transmit signals to deliver them to the antenna elements through corresponding ones of the n antenna duplexer.

15. A high sensitivity radio receiver according to claim 14 in which second receiving filters in the n antenna duplexers which eliminate respective transmission frequency bands and pass respective reception frequency bands are confined in the cryostat to be cooled down by the cooling means.

16. A high sensitivity radio receiver according to any one of claims 8 to 14 and 9, 10, 13, 15 to 7, in which the phase shifter comprises a superconductor material which assumes a superconducting condition at a temperature to which it is cooled down by the cooling means.

* * * * *